May 4, 1965     I. GARDNER     3,181,395
REAMER CLIP TOOL
Filed Dec. 26, 1962
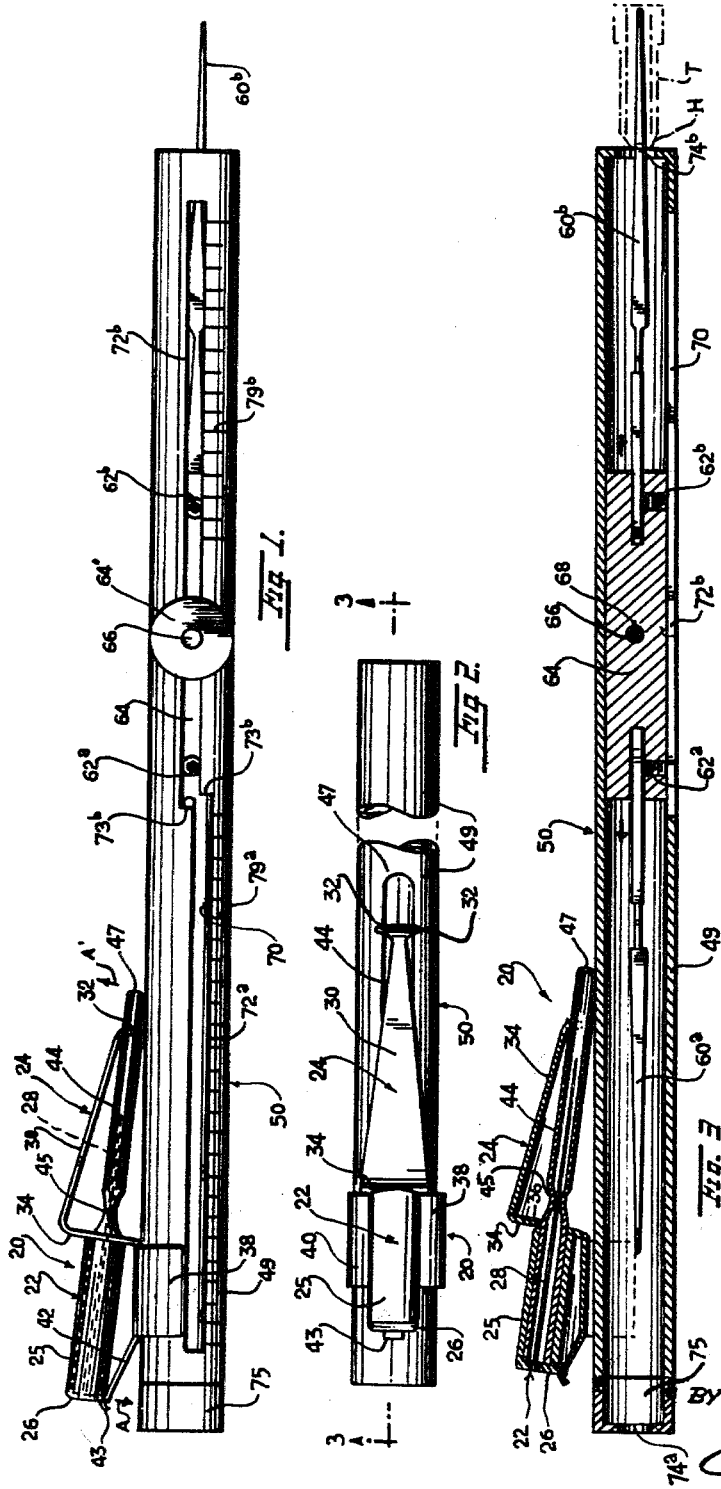
INVENTOR.
IRVING GARDNER
ATTORNEY

United States Patent Office 3,181,395
Patented May 4, 1965

3,181,395
REAMER CLIP TOOL
Irving Gardner, Hunter, N.Y.
Filed Dec. 26, 1962, Ser. No. 247,262
3 Claims. (Cl. 77—72)

This invention relates to a novel reamer for orifices of fuel burner nipples or the like, and more particularly concerns a reamer and pocket clip assembly.

In my prior patent application, Serial No. 238,510 filed November 19, 1962, I have disclosed a reamer tool assembly including a tubular casing or barrel in which is an axially slidable plug which can be fixed in position in the casing. Extending axially from opposite ends of the plug are two tapered reamers. These reamers have different widths and tapers for reaming orifices of different sizes. Either reamer can be extended out of an end of the casing and can be locked in position by means of a thumb screw. A clip is provided on the casing for supporting the device on a user's pocket or other garment portion when the device is not in use.

According to the present invention, a fine, flexible reamer of narrower width than the other reamers inside the casing is provided as part of the pocket clip which is used as the support for the device. The clip and fine reamer are so arranged that they can be removed from the casing and mounted on any cylindrical support, but the fine reamer will have its greatest utility as part of a set including the reamers in the tubular casing while the clip serves as a support for the casing.

It is therefore one object of the invention to provide a reamer and pocket clip assembly for a reamer tool.

It is another object to provide a reamer tool casing having an integral spring pocket clip with a reamer removably disposed therein.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a side elevational view of a reamer tool embodying the invention.

FIG. 2 is a plan view of the tool of FIG. 1, parts being broken away.

FIG. 3 is a sectional view taken on line 3—3 of FIG. 2.

Referring first to FIGS. 1–3, there is shown a reamer and clip assembly 20 including a reamer tool 22 and a pocket clip 24. The reamer tool includes a hollow cylindrical or tubular handle 25 with a closed end 26. One end of a needle-like reamer 28 is secured at the closed handle end 26. The reamer 28 extends axially through the handle 25 and out of the open end of the handle.

The clip 24 is formed from a single piece of metal or plastic pressed or molded to required form. The clip has an elongated generally triangular spring arm 30 formed with lateral projections 32 at its narrow free end. The wider end of the arm is integral with an upstanding wall 34 which has a hole 36 therein. Two opposed curved spring fingers or flanges 38 are integral with a plate 40, one end of which is integral with an angularly disposed to wall 34. A spring finger 42 extends outwardly of the other end of plate 40. Finger 42 has a bent or curved tip 43 releasably engaging the closed end 26 of the handle 25.

A cylindrical tubular holder 44 is provided for the reamer as part of the clip. This holder is closed at one end 47.

The tubular sheath or holder 44 extends through hole 36 in wall 34. The reamer handle 25 fits frictionally on the open end of holder 44 and is held there by the spring pressure of tip 43 of finger 42 as clearly shown in FIGS. 1 and 2. The holder 44 has a flattened intermediate portion 45 which engages at hole 36. Thus the holder is securely engaged in the clip. The reamer 28 extends axially into the holder 44 and may be held by inner sides of the flattened portion 45.

When the clip 24 is mounted on a cylindrical casing 49 of a reamer tool 50 as shown in FIGS. 1, 2 and 3, the spring fingers or flanges 38 engage opposite sides of the casing. The arm 30 presses the closed rounded end 47 of the holder 44 inwardly against the side of the casing, while the finger 42 presses outwardly on the handle 25. The lateral projections 32 engage holder 44 preventing arm 30 from turning.

To engage the clip on the pocket of a garment, the handle 25 will be pressed manually inward toward the casing 49 which will cause the end 47 of holder 44 to move outwardly, as indicated by arrows A, A' in FIG. 1. This will open a space between the closed end 47 of holder 44 and the casing 49 to receive the edge of a garment pocket, apron, or the like for supporting the tool.

To use the reamer 28, the handle 25 can be pulled axially outward from engagement with finger 42 by pressing inwardly against the finger to release tip 43. The clip will remain engaged with the casing 49 and with the garment edge upon which the clip and casing may be mounted, since holder 44 is not disturbed by removal of the reamer.

The reamer and clip assembly can remain mounted on casing 49 without interfering in any way with normal use and operation of the reamers $60^a$, $60^b$ are engaged by set screws $62^a$, $62^b$ in a cylindrical plug 64. The plug slides axially inside the casing and can be fixed in position by a thumb screw 64 having a threaded shank 66 rotatable in a threaded hole 68 in the plug. The casing 49 has a longitudinal slot 70 with two slot portions $72^a$, $72^b$ offset from each other circumferentially of the casing at intermediate slot portions $73^a$, $74^b$. When the shank 66 is located at the slot portions $73^a$, $73^b$ the reamers $60^a$, $60^b$ are wholly withdrawn inside the casing. Either reamer can extend through hole $74^a$ or $74^b$ at opposite ends of the casing to ream orifice H of a burner tip T; see FIG. 3. The casing can be provided with a removable end cap 75 for replacement of the reamers $60^a$, $60^b$ when required. Scales $79^a$, $79^b$ can be marked on the outside of casing 49 for indicating extension of the reamers.

The invention makes it possible in one tool assembly to include a set of three reamers of different sizes. This provides a serviceman, mechanic, engineer or technician with a sufficient range of reamer sizes to fulfill most burner orifice reaming requirements, in one convenient portable instrument.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A reamer and clip assembly for mounting on a cylindrical tool body, comprising a needle-like reamer, a hollow tubular handle having open and closed opposite ends, said reamer having one end secured to said closed end inside of the handle and extending axially through the handle, the other end of the reamer being located beyond the open end of the handle, a tubular sheath having open and closed ends, said reamer being axially inserted in said sheath with the open end of the sheath slidably interfitted with and inside of the handle; and a spring clip having a plate with curved opposing flanges for engaging said cylindrical tool body, a plate portion extending angularly to said plate with a hole in said plate portion, a tapered flexible arm having one end integral with said plate portion and extending angularly to said sheath extending axially through said hole in said plate portion, said sheath having a widened and flattened portion engaged at said plate portion, whereby said sheath is held by said arm and is urged thereby toward said body, and a spring finger extending outwardly of said plate oppositely from said arm, said spring finger engaging said handle and holding the same in engagement with said sheath.

2. In a reamer and clip assembly for mounting on a cylindrical tool body, a spring clip having a plate with arcuate opposing flanges for engaging said tool body, a plate portion extending angularly to said plate with a hole in said plate portion, a tapered flexible arm having one end integral with said plate portion and extending angularly to said plate portion, and a tubular sheath for holding said reamer, said sheath extending through the hole in said plate portion, said arm having lateral projections on an end portion engaging the sheath, said sheath having a widened and flattened portion for engaging at said plate portion, whereby said clip holds said sheath and said arm urges the same toward said tool body when said flanges are engaged on said tool body.

3. In a reamer and clip assembly for mounting on a cylindrical tool body, a spring clip having a plate with arcuate opposing flanges for engaging said tool body, a plate portion extending angularly to said plate with a hole in said plate portion, a tapered flexible arm having one end integral with said plate portion and extending angularly to said plate portion, a tubular sheath for holding said reamer, said sheath extending through the hole in said plate portion, said arm having lateral projections on an end portion engaging the sheath, said sheath having a widened and flattened portion for engaging at said plate portion, whereby said clip holds said sheath and said arm urges the same toward said tool body when said flanges are engaged on said tool body, and a spring finger extending outwardly of said plate oppositely from said arm for frictionally engaging a handle portion of said reamer.

References Cited by the Examiner
UNITED STATES PATENTS

| | | |
|---|---|---|
| 1,442,365 | 1/23 | Soltesz. |
| 1,554,517 | 9/25 | O'Neill _____ 24—11 |

FOREIGN PATENTS

| | | |
|---|---|---|
| 966,424 | 3/50 | France. |
| 163,301 | 12/21 | Great Britain. |

WILLIAM W. DYER, Jr., *Primary Examiner.*

JOHN C. CHRISTIE, *Examiner.*